Figure 1:
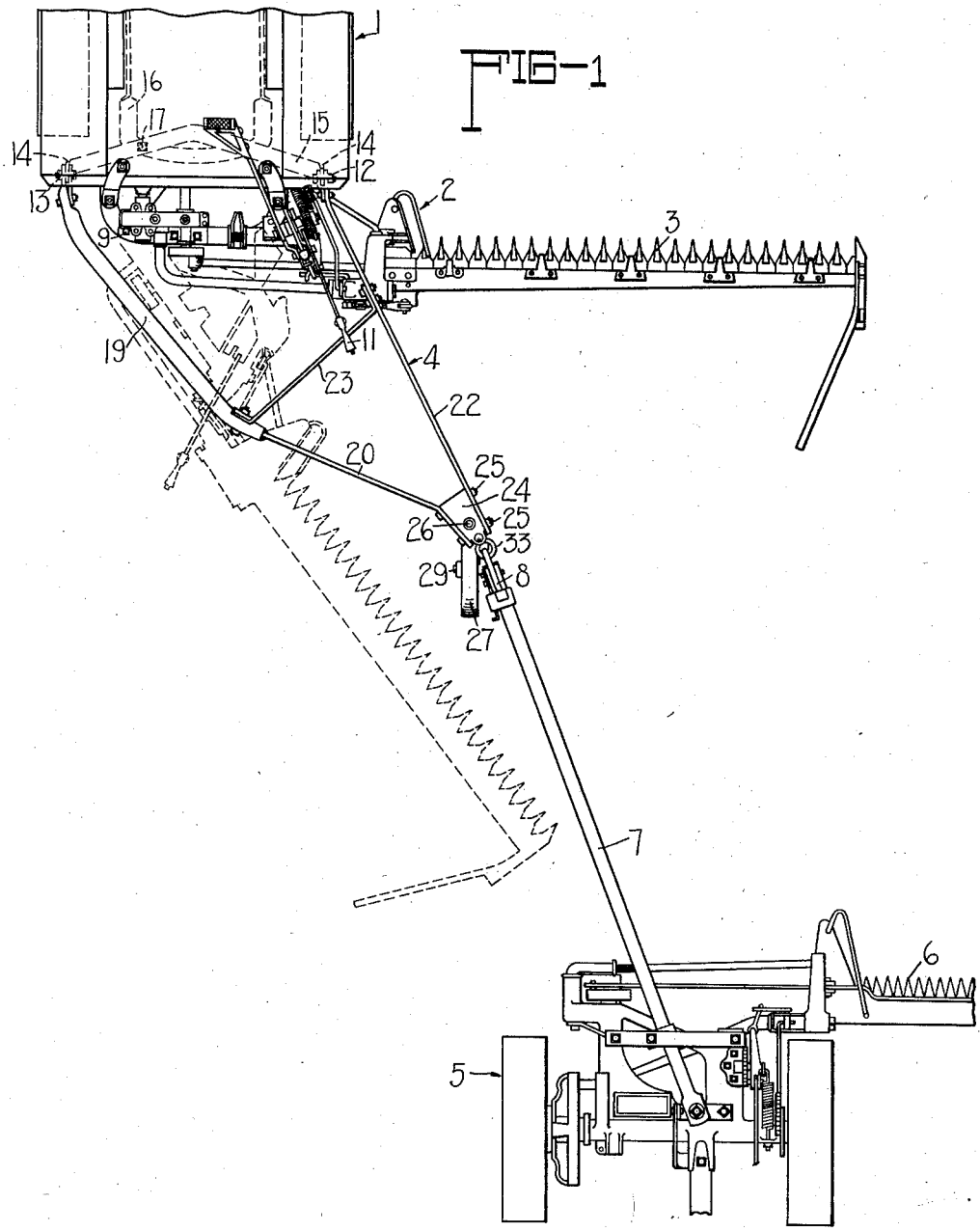

June 11, 1935.  T. W. PAUL  2,004,213
HITCH CONNECTION
Filed Nov. 18, 1932   2 Sheets-Sheet 1

WITNESS.
Edward Melin.

INVENTOR.
Talbert W. Paul
BY Brown, Jackson, Boettcher & Dienner
ATTORNEYS.

June 11, 1935.  T. W. PAUL  2,004,213
HITCH CONNECTION
Filed Nov. 18, 1932   2 Sheets-Sheet 2

WITNESS.
Edward Melin

INVENTOR.
Talbert W. Paul
BY
Brown, Jackson, Boettcher & Diemer
ATTORNEYS.

Patented June 11, 1935

2,004,213

UNITED STATES PATENT OFFICE 2,004,213

HITCH CONNECTION

Talbert W. Paul, Kansas City, Kans., assignor to Deere & Company, Moline, Ill., a corporation of Illinois Application November 18, 1932, Serial No. 643,181

8 Claims. (Cl. 280—33.44)

This invention relates to hitch means for connecting a pair of vehicles and more particularly to hitch means associated with a pulling implement, such as a general purpose tractor, and which is adapted for connection with a pulled implement, such as a mower.

In most pulled or trailing implements the line of draft extends from the point of hitch connection with the tractor to the center of resistance of the load. Generally the latter point is below the hitch point and as a result thereof the line of draft extends downwardly and rearwardly from the tractor and will, if extended forwardly be a considerable distance above the points of contact of the traction wheels with the ground. The greater this distance the greater will be the tendency for the draft reaction to cause the front end of the tractor to tip upwardly.

With these factors in mind, the present invention contemplates, as the main object thereof, the provision of hitch means which provides an arrangement wherein the line of draft extends from the tractor, not downwardly and rearwardly but upwardly and rearwardly. This means that the tendency for the load to tip the tractor is greatly reduced, for if the line of draft be extended forwardly it will coincide with or come close to the points of contact of the traction wheels with the ground.

Further, in the use of tractor pulled mowers and the like, various difficulties have heretofore been encountered when utilizing hitch means of the types now in existence which render the hitch means of prior construction decidedly objectionable, both from the standpoint of practicability and economy. For example, it is the general practice to provide both the tractor and the mower with draft members that are fixed to either or both of these implements or which are pivoted to either or both for horizontal swinging movement thereon only, and which members are pivotally connected together at some intermediate point between the respective implements to allow the latter to turn relative to each other. And also, the intermediate point at which the two draft members of the respective implements are connected is positioned at a considerable distance above the ground for clearance purposes, particularly when this hitch means is used for a mower that is connected with a general purpose tractor having a mower attachment secured thereto and capable of swinging rearwardly upon striking an obstruction. The reaction due to the transmission of draft through such a hitch means is the resultant of components other than those directed longitudinally of the draft members. Certain components act downwardly upon the tractor draft member and towards the ground. These downwardly acting components become very evident and objectionable when the implement is being operated in heavy crops and especially when the implement is being drawn upgrade, the result being that there is a tendency to raise the front end of the tractor from the ground through the connection of the implement draft tongue with the tractor draft member.

Another object, therefore, of the present invention is to provide a hitch means between a pair of vehicles, and particularly between a general purpose tractor and a mower, which will eliminate the objectionable tendency for the mower to act upon the tractor draft member to cause the forward end of the tractor to be raised from the ground about the rear axle as a fulcrum. Moreover, the present hitch means is so constructed that the objectionable vertically acting components react, not downwardly against the tractor which would tend to tilt the front end upwardly, but downwardly against the ground rearwardly of the tractor, as a result of which there is actually some reaction upwardly against the tractor at the hitch point. Obviously, with the hitch means connected considerably to the rear of the tractor and so arranged as to only create an upwardly acting force at the point of connection of the hitch means with the tractor, the whole weight of the rear end of the tractor and its associated attachments are utilized to overcome whatever upwardly acting force may be imparted to the tractor at the connection of the hitch means therewith.

A further object of the present invention is to provide a tractor with a hitch means comprising a frame that is pivotally connected with the tractor at spaced points thereon to swing about a transverse longitudinal axis with respect to the tractor and which frame is supported at its rear end by any suitable means that reacts against the ground to maintain the rear end of the frame substantially at a predetermined distance above the ground.

Another object of the present invention is to provide a caster wheel for supporting the rear end of the hitch means of the tractor at a substantially predetermined distance above the ground. The caster wheel has been provided to serve a twofold purpose, namely, to support the rear end of the tractor draft means in the manner explained, and secondly, to allow a swingable cutter bar of a mower attachment for the tractor to swing rearwardly from its normal operative position forwardly of the caster wheel to its extreme retracted position to the rear of the caster wheel, the cutter bar being so moved for any reason, as by coming in contact with an obstruction.

A further object of the present invention is the provision of an articulated hitch device in which the draft is transmitted upwardly from the pulling vehicle and then downwardly to the trailing unit, which construction, in connection with suitable means to take the reaction component at the point of the change in direction, effectively prevents the draft reaction from tipping the front end of the pulling vehicle upwardly.

Other objects and advantages, such as providing the tractor with an offset hitch means for accommodating tandem mowers, and as providing a substantially open centered draft means for the tractor to readily accommodate the operating mechanisms of a mower attachment during the operation of the mower, will hereinafter appear in the following detailed description of the present invention having reference to the accompanying drawings.

Figure 2:
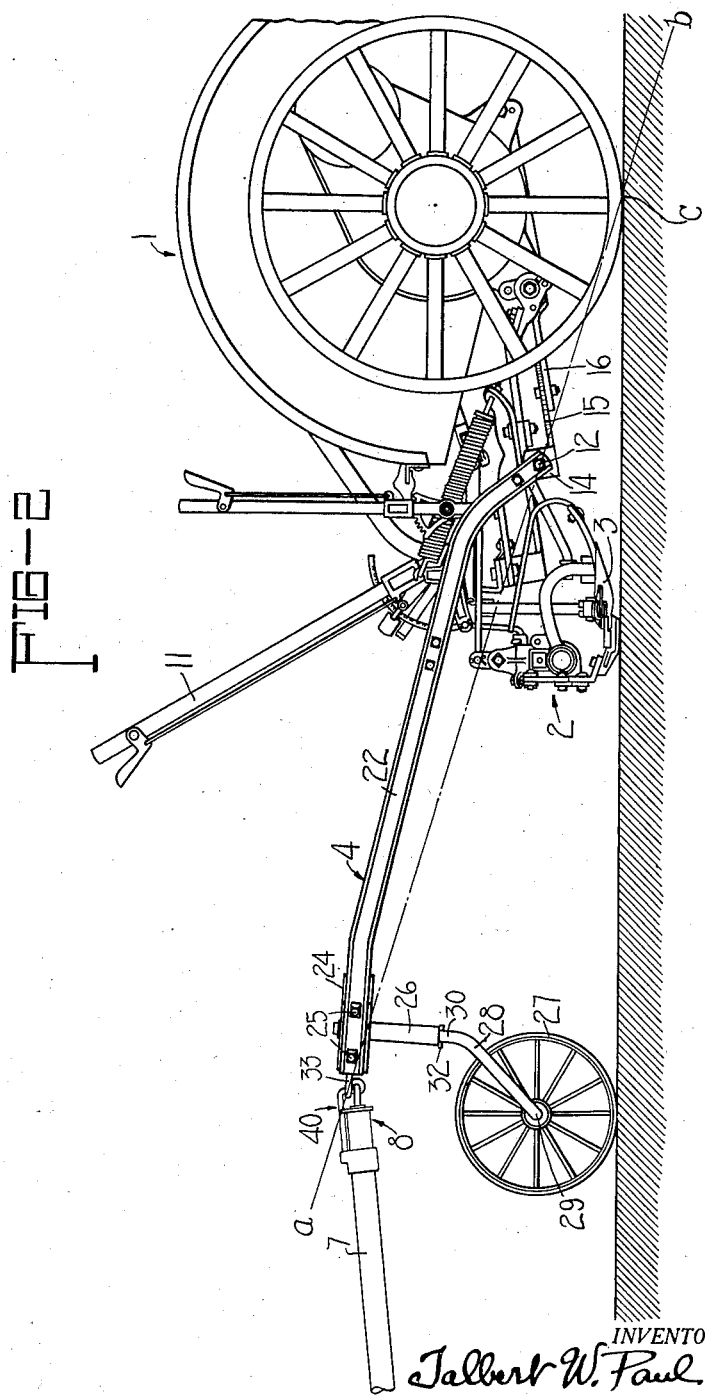

In the drawings:

Figure 1 is a plan view of a preferred embodiment of the present invention illustrating the same as associated with a general purpose tractor to which is connected a suitable two-wheeled implement such as a mower; and Figure 2 is a fragmentary side elevational view of the preferred embodiment of the invention illustrated in Figure 1.

Referring now to the drawings, the tractor is indicated generally at 1 supporting a mower attachment 2 which includes a swingable cutter bar 3, and having the hitch means of the present invention suitably connected therewith and indicated generally as a draft frame 4. A trailing vehicle or implement is indicated at 5 and comprises a two-wheeled mower of conventional design having its cutter bar 6 arranged in offset relation to the cutter bar 3 of the tractor and which is provided with a suitable draft tongue 7 having a spring release hitch 8 at the forward end of the tongue for connection with the hitch means 4 of the tractor. The mower attachment 2 may be of any conventional type wherein the cutter bar 3 is normally maintained in transverse alignment with the tractor under normal operating conditions and which is capable of swinging rearwardly out of the path of an obstruction encountered thereby. In this instance, the cutter bar 3 is pivotally supported at point 9 upon the tractor 1 and is capable of swinging substantially into the dotted line position indicated at 10, the operating mechanism of the mower attachment also including a lifting lever 11.

The hitch means of the present invention preferably comprises the draft frame 4 which is pivotally supported at laterally spaced hitch points 12 and 13 by means of bolts or other suitable means for pivotally connecting the draft frame to the upturned ends 14 of a bar 15. Bar 15 is secured to the U-shaped draw bar 16 of the tractor by any suitable means as by means of bolts 17.

It is obvious that the tractor end of the draft frame 4 need not be limited to receive its support by the specific means described including bar 15, since any suitable means may be employed for supporting the draft frame on the tractor so long as the frame is connected at spaced hitch points for free pivotal movement about an axis disposed generally transversely of the tractor and whereby the draft frame is prevented from swinging horizontally with respect to the tractor.

The draft frame preferably includes a pipe section 19 the rear end of which is fixed to a bar member 20, a bar member 22, and brace means such as bar 23 suitably connected between the rear end of pipe section 19 and the intermediate portion of bar member 22. The rear ends of the bar members 20 and 22 terminate substantially adjacent one another and are suitably connected by means of a member 24 to which they are secured by bolts 25 or the like. Member 24 is preferably a casting which is suitably provided with a substantially vertically disposed sleeve 26 for the purpose of accommodating a caster wheel 27 or any other like means which may be adapted for maintaining the rear end of the draft frame 4 at a substantially predetermined distance above the ground. The draft means of the present invention is thus constructed as an open centered draft frame, and the operative means associated with the cutter bar 3, including lever 11, is positioned adjacent the rear end of the tractor and within the open centered frame and is capable of swinging with the cutter bar without striking the frame or otherwise interfering therewith. To further avoid interference, tubular member 19 is preferably bent in the manner illustrated.

An inclined spindle member 28 is provided for supporting the rearward end of the draft frame 4 upon the wheel 27, the spindle member being provided with a horizontally bent portion forming an axle 29 for the wheel 27, and a substantially vertically disposed shank 30 which is journaled within sleeve 26. Any suitable means may be provided for preventing relative axial movement between the sleeve 26 and shank 30, such as a pin 32 extending through shank 30 and being adapted for abuttingly engaging the lower edge of sleeve 26. A similar pin may be disposed in the upper end of the spindle 30.

The rearward end of the draft frame 4 may be suitably provided with any type of hitch connection for the draft tongue or other means of the trailing vehicle, and in this instance an eye 33 is conveniently secured to the casting 24 and extends rearwardly. It is further to be noted that the draft means comprising a frame of the construction described is so designed as to dispose the hitching eye 33 considerably laterally to the direct fore and aft line of draft of the tractor, and also materially above the level of the hitch point 12 of the tractor, so that the trailing implement can be drawn in the desired offset relation to the tractor. For this reason the draft frame is subjected to a considerable lateral thrust due to the offset relation of the trailing implement. Consequently members 19 and 20 of the draft frame will substantially always be subjected to compression and must, therefore, be suitably reenforced to prevent buckling. It is for this purpose that it is preferable to provide the tubular section 19 to fully sustain the compressive forces, while member 23 provides the necessary brace means for preventing buckling of members 19 and 20. It is apparent therefore, that a draft frame constructed substantially as described constitutes a rigid and inexpensive hitch means for drawing the trailing vehicle in offset relation to the tractor.

When the vehicles or implements are traveling over a field, the draft frame 4 swings vertically about its transverse axis on the tractor as the caster wheel 27 follows the undulations in the ground. The caster wheel therefore functions both as a partial supporting means for supporting a part of the weight of the draft frame and also serves as a means for maintaining the rear end of said draft frame at a predetermined distance above the ground and above the tractor hitch point 12. The utilization of a caster wheel for the support of the rear end of the draft frame is desirable since the caster wheel will automatically adjust itself to the lateral movement of the rear end of the draft frame as the tractor weaves or turns thereby eliminating any additional lateral drag upon the rear end of the draft frame 4. Moreover, the use of a relatively large caster wheel is also preferable to allow the cutter bar of the mower attachment for the tractor to freely swing rearwardly underneath the caster wheel when the same meets an obstruction, and the latter, because of its relatively large diameter, is capable of rolling freely over the swinging cutter bar with a minimum amount of resistance to further prevent any additional strain upon the rear end of the draft frame or the cutter bar or other parts.

With a hitch means of the present design, the line of draft is so disposed relative to the tractor as to substantially eliminate the transmission of such forces to the tractor from the trailing implement as would tend to tilt the tractor and raise the front end thereof from the ground. As shown in Figure 2, the normal line of draft $a-b$ passes through or near the point of hitch at 40 and the points 12—13 where the draft frame is attached to the tractor, and intersects the ground surface substantially at or near $c$, the point of contact of the rear tractor wheels with the ground. Since point $c$ coincides substantially with the point at which the tractor reacts against the ground, and since the line of draft passes substantially through point $c$, no objectional moment is created at point $c$, by the reaction of the rearwardly and upwardly acting force of draft, that will cause the tractor to tilt.

In addition to the foregoing the present design of hitch means also eliminates a further factor which caused tilting of a tractor in former constructions wherein a draft frame, such as 4, was fixed to the tractor and wherein no means was provided for supporting the rearward end of the frame in a substantially fixed spaced relation to the ground. In such former hitch means, a downwardly and rearwardly acting draft force would act downwardly upon the rear end of the fixed draft frame and tended to cause the front end of the tractor to move upwardly about the rear axle as a fulcrum. In the present device, such downwardly acting forces, as are transmitted through the draft tongue of the trailing vehicle to the hitch point 40 at the rear end of the draft frame 4, are directly opposed by the reaction of the caster wheel 27 upon the ground and the tendency for such downwardly acting forces to tilt the front end of the tractor upwardly becomes ineffective.

It is to be understood that the above description is particularly directed to the preferred embodiment of the present invention as disclosed in the drawings and that the invention need not specifically be limited to the construction therein illustrated. Moreover, it is contemplated that certain changes may be made in the device disclosed which will not depart from the essence of the present invention. Therefore, it is intended that the invention shall only be limited by the spirit and scope of the appended claims.

What I claim is:

1. A tractor hitch device comprising a frame adapted to be pivotally connected with the tractor at relatively low laterally spaced points thereon to swing about a transverse axis with respect to but movable laterally with the tractor during normal operation, means connected with said frame to support the rear end thereof, and a hitch connection carried adjacent the rear end of said frame and disposed sufficiently above said laterally spaced points so that a line extending from said hitch connection through the axis defined by said spaced points intersects the ground adjacent the rear of the tractor.

2. A hitch device for connection with a vehicle having traction wheels, said device comprising draft means connected with said vehicle below the axis of said wheels for lateral movement with the vehicle and vertical movement relative to the vehicle, means providing for the pivotal connection of an implement with the rear end of said frame at a predetermined distance above the point of connection between said draft means and the vehicle, and means connected with said draft means for supporting the rear end of the latter at said predetermined distance above the point of connection with the vehicle, while accommodating the lateral movement of said draft means with the vehicle and providing for the establishment of a line of draft inclined downwardly and forwardly and extending from the pivotal connection between the draft means and the implement through the connection between the draft means and the vehicle and intersecting the ground substantially at the point of contact of said traction wheels therewith.

3. A hitch device for a pulling implement comprising wheel means, a hitch member supported by said wheel means and adapted for connection with a trailing vehicle, and means pivotally connecting the forward end of said hitch member with said pulling implement for relative vertical movement about a generally transverse axis so as to dispose the forward end of said hitch member substantially in a line of draft passing through the point of connection of said vertically pivoted means and intersecting the ground substantially at a point coincident with a line passing through the points of contact of the rear wheels of the pulling vehicle with the ground.

4. A hitch device for connecting a trailing implement with a pulling implement, said trailing implement having a forwardly extending draft member, said hitch device comprising a diagonally extending frame pivotally supported on said implement for vertical swinging movement, means for maintaining the rear end of said frame in spaced relation to the ground, said frame comprising a member pivoted on said pulling implement and adapted to act in tension, a tubular member pivotally connected with the pulling implement and adapted to act in compression, and means for connecting the rearward ends of said members, and means carried by said last mentioned means for pivotally connecting the forward end of said forwardly extending member therewith.

5. In the combination of a tractor, and a mower attached to said tractor and having a cutter bar adapted for swinging rearwardly relative to the tractor, a hitch device comprising a frame having its forward end pivotally connected with said tractor, and means connected with the rear end of said frame and contacting the ground for supporting said frame in spaced relation to the ground, said means permitting said bar to pass thereunder when said bar is swung relatively to the tractor.

6. In combination with a tractor and a mower attached to said tractor and having a cutter bar adapted for swinging rearwardly relative to the tractor, a hitch device comprising a frame having its forward end pivotally connected with said tractor for vertical swinging movement only, said frame having an open center so that the mower and cutter bar clears the same in their swinging movement, and wheel means connected with the rear end of said frame and contacting the ground for supporting said frame in spaced relation to the ground.

7. A hitch device for use with a farming implement having operative means connected therewith and including a part adapted for horizontal swinging movement relative to said implement, comprising a draft member pivoted on said implement and disposed over said operative means, and supporting means for said member connected therewith rearwardly of said operative means and engaging the ground at a point directly in the path of said swingable part, said supporting means being adapted to pass over said operative means as the latter is swung rearwardly relative to the implement, said draft member including means at the rear thereof to transmit draft to another implement.

8. A hitch device in combination with a tractor, and a mower attachment carried by said tractor having a rearwardly swingable cutter bar extending laterally outwardly from the tractor with operative means connected with said cutter bar and disposed adjacent the rear end of said tractor to swing with the cutter bar, said hitch device comprising an open centered draft frame pivotally connected at spaced points on the rear end of said tractor and to either side of said operative means of the mower whereby said operative means may be swung with said cutter bar within the open centered frame, and wheel means connected with said draft frame and contacting the ground at a point in the path of the swingable cutter bar for supporting said frame in spaced relation to the ground, said wheel means being adapted to pass over said cutter bar as the latter is swung relative to said tractor.

TALBERT W. PAUL.